US006085199A

United States Patent [19]
Rose

[11] Patent Number: 6,085,199
[45] Date of Patent: Jul. 4, 2000

[54] METHOD FOR DISTRIBUTING A FILE IN A PLURALITY OF DIFFERENT FILE FORMATS

[75] Inventor: Robert A. Rose, Round Rock, Tex.

[73] Assignee: International Business Machines Corporation, Armonk, N.Y.

[21] Appl. No.: 08/977,635

[22] Filed: Nov. 24, 1997

[51] Int. Cl.[7] ................................................. G06F 17/30
[52] U.S. Cl. ........................... 707/104; 707/1; 707/513; 707/526; 707/501
[58] Field of Search ............................. 707/10, 205, 104, 707/1, 513, 526, 501

[56] References Cited

U.S. PATENT DOCUMENTS

| | | | |
|---|---|---|---|
| 5,309,358 | 5/1994 | Andrews et al. | 709/1 |
| 5,339,392 | 8/1994 | Risberg et al. | 345/333 |
| 5,446,653 | 8/1995 | Miller et al. | 705/4 |
| 5,448,375 | 9/1995 | Cooper et al. | 358/403 |
| 5,627,967 | 5/1997 | Dauerer et al. | 713/202 |
| 5,627,996 | 5/1997 | Bauer | 395/600 |
| 5,644,507 | 7/1997 | Ostrover et al. | 386/125 |
| 5,680,223 | 10/1997 | Cooper et al. | 358/403 |
| 5,751,280 | 5/1998 | Abbott et al. | 345/302 |
| 5,765,154 | 6/1998 | Horikiri et al. | 707/10 |
| 5,819,301 | 10/1998 | Rowe et al. | 707/513 |
| 5,826,265 | 10/1998 | Huben et al. | 707/8 |
| 5,848,415 | 12/1998 | Guck | 707/10 |
| 5,860,074 | 1/1999 | Rowe et al. | 707/526 |
| 5,864,870 | 1/1999 | Guck | 707/104 |
| 5,867,162 | 2/1999 | O'Leary et al. | 345/352 |
| 5,890,171 | 3/1999 | Blumer et al. | 707/501 |
| 5,896,530 | 4/1999 | White | 707/1 |
| 5,920,872 | 7/1999 | Grewell et al. | 707/202 |
| 5,928,333 | 7/1999 | Landfield et al. | 709/245 |
| 5,943,093 | 8/1999 | Anderson et al. | 348/232 |

*Primary Examiner*—Thomas G. Black
*Assistant Examiner*—Jean M. Corrielus
*Attorney, Agent, or Firm*—Robert V. Wilder; Leslie A. Van Leeuwen

[57] ABSTRACT

A method and implementing computer system is provided in which a network file system is operable to report multiple virtual files in various formats for a single native file in storage. When one of the files is opened, the file system reads data from the single native file and converts the format on the fly to the destination format that was opened by the operating system. The operating system thus converts files spontaneously on request and provides a synthetic file in a desired one of a plurality of possible formats while requiring the storage of only one native content file in server memory. Further aspects of the file system include provisions for additional features including Directory, Open File, Read File, Write File and Seek operations.

15 Claims, 5 Drawing Sheets

METHOD FOR DISTRIBUTING A FILE IN A PLURALITY OF DIFFERENT FILE FORMATS

FIELD OF THE INVENTION

The present invention relates generally to information processing systems and more particularly to a methodology and implementation for providing a system for the distribution of files in a plurality of different file formats.

BACKGROUND OF THE INVENTION

In network computer systems, a plurality of computers are connected together and one or more of the computers generally performs the function of a network server. A network may be established through the hard-wired interconnection of a plurality of computer terminals in a local network or on a wider scale such as the Internet or world wide web which may include telecommunication links. In any case, the network server acts as the central control unit for providing access to files, programs and program execution to the individual computers connected within the network. In general, a networked computer terminal will "logon" to the network and obtain access to a network server. The network server will download a homepage presentation on the user's terminal which may include audio and video effects. From the initial screen display, a user may designate any other "address" to get to another "location" or screen display. The user may also select from a plurality of functions which may be presented for user selection on the initial display.

Generally, almost all screen displays include designated selection areas on the screen where the user may point a selection device such as a mouse-controlled pointer, and "click" on the designated screen area to invoke a displayed function, or menu for other function selection options. When the homepage or selection screen is downloaded from the server, many small programs or "applets" are also downloaded at the same time to the user's terminal memory. Those applets are associated with different ones of the designated screen selection areas and are executed when a user makes a selection or clicks on one of the selection areas on the display. The applets, in turn, may call for the presentation of a new user interface screen, or a new or different section of a portion of the screen, such as a pop-up menu or other graphical user interface (GUI) which may be within a framed or windowed sub-section of the main homepage.

The use of applets which contain sound and moving video presentations on a screen display is increasing. Typically, a user may logon to a particular homepage on the web for example, and the page will contain hypertext links which, when selected, will retrieve a file containing video and/or sound presentations. The video and/or sound files referenced by the hyperlinks reside in server memory and are downloaded to a user terminal in response to a user selection or clicking-on of a corresponding hyperlink presented on a user's display screen. The files are then "played" or presented by a program in the user's memory. However, there are many different formats in which these files may be packaged and the particular program to which a user has access typically can only run one or only a few of the formats in which the video or sound file may be presented. With audio files for example, there are several current format standards for audio data on the Internet, including but not limited to files having file extensions of "wav", "au", ".midi/.mid", ".aiff/.aif" and "snd". Accordingly, servers or webmasters must face a trade-off viz. to support only a single format or devote large amounts of disk space to store files in all of the popular formats.

Thus, there is a need for an improved filing methodology and system which is effective to accommodate the storage of network files capable of being utilized in a plurality of different formats while at the same time reducing the storage space required to store such files.

SUMMARY OF THE INVENTION

A method and implementing computer system is provided in which a network file system is operable to report multiple virtual files in various formats for a single native file in storage. When one of the files is opened, the file system reads data from the single native file and converts the format on the fly to the destination format that was opened by the operating system. The operating system thus converts files spontaneously on request and provides a synthetic file in a desired one of a plurality of possible formats while requiring the storage of only one native content file in server memory. Further aspects of the file system include provisions for additional features including Directory, Open File, Read File, Write File and Seek operations.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
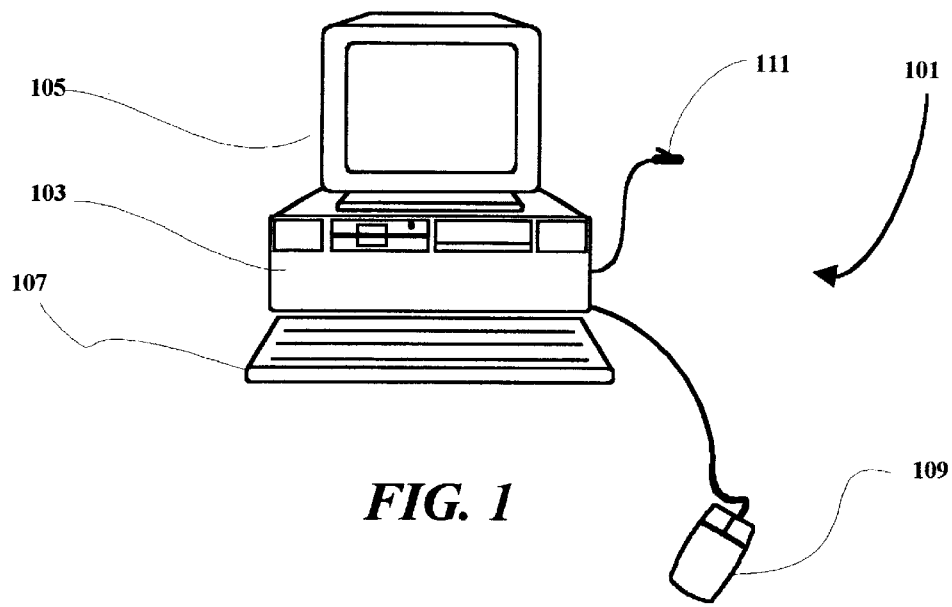
FIG. 1 is a diagram of a computer system in which the present invention may be implemented.

With reference to FIG. 1, the various methods discussed herein may be implemented within a computer network including a computer terminal 101, which may comprise either a workstation or a PC for example. In general, an implementing computer system may include computers configured with a plurality of processors in a multi-bus system in a network of similar systems. However, since the workstation or computer terminal 101 implementing the present invention in an exemplary embodiment, is generally known in the art and composed of electronic components and circuits which are also generally known to those skilled in the art, circuit details beyond those shown in FIG. 1, are not specified to any greater extent than that considered necessary as illustrated, for the understanding and appreciation of the underlying concepts of the present invention and in order not to obfuscate or distract from the teachings of the present invention.

In FIG. 1, the computer system includes a processor unit 103 which is typically arranged for housing a processor circuit along with other component devices and subsystems of the computer terminal 101. The computer terminal 101 also includes a monitor unit 105, a keyboard 107 and a mouse or pointing device 109, which are all interconnected with the computer terminal illustrated. Also shown is a connector 111 which is arranged for connecting a modem within the computer terminal to a communication line such as a telephone line in the present example. The present invention may also be implemented in a cellular system.

Figure 2:
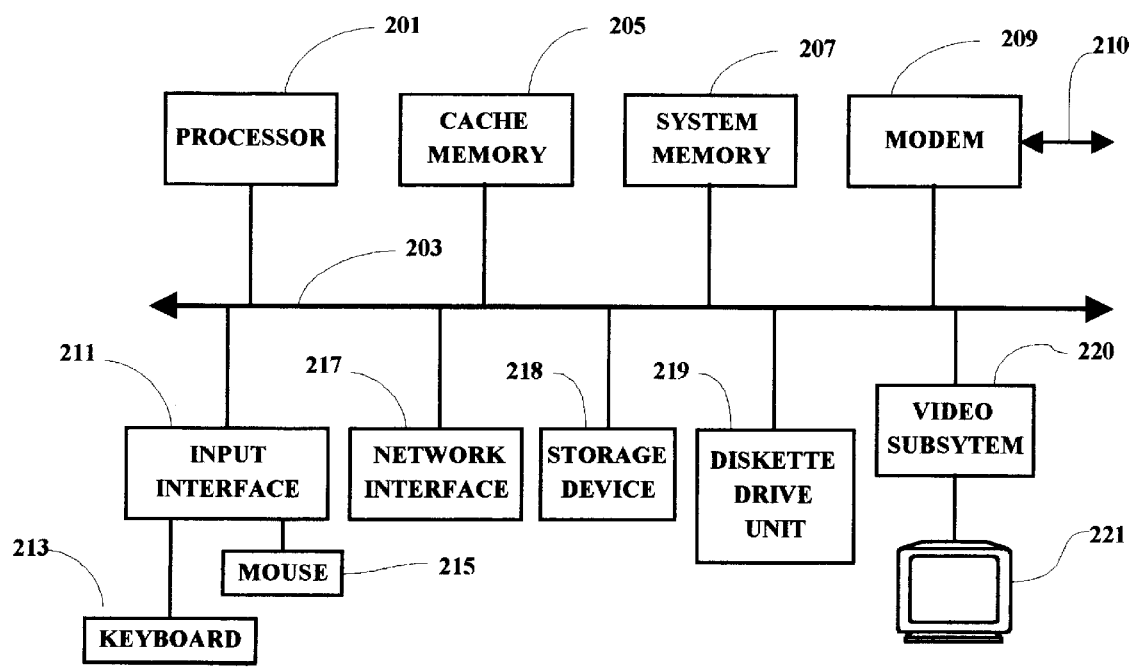
FIG. 2 is a simplified schematic diagram showing selected components and subsystems of the computer system illustrated in FIG. 1.

Several of the major components of the terminal 101 are illustrated in FIG. 2. A processor circuit 201 is connected to a system bus 203 which may be any host system bus. It is noted that the processing methodology disclosed herein will apply to many different bus and/or network configurations. A cache memory device 205, and a system memory unit are also connected to the bus 203. A modem 209 is arranged for connection 210 to a communication line, such as a telephone line, through a connector 111 (FIG. 1). The modem 209, in the present example, selectively enables the computer terminal 101 to establish a communication link and initiate communication with network server, such as the Internet.

The system bus 203 is also connected through an input interface circuit 211 to a keyboard 213 and a mouse or pointing device 215. The bus 203 may also be coupled through a hard-wired network interface subsystem 217. A diskette drive unit 219 is also shown as being coupled to the bus 203. A video subsystem 220, which may include a graphics subsystem, is connected to a display device 221. A storage device 218, which may comprise a hard drive unit, is also coupled to the bus 203. The diskette drive unit provides a means by which individual diskette programs may be loaded on to the hard drive, or accessed directly, for selective execution by the computer terminal 101. As is well known, program diskettes containing application programs represented by magnetic indicia on the diskette, may be read from the diskette drive, and the computer system is selectively operable to read such magnetic indicia and create program signals. Such program signals are selectively effective to cause the computer system to present displays on the screen of a display device and respond to user inputs in accordance with the functional flow of the application program on the diskette.

In running an Internet access program or browser program on the computer terminal 101, the access program is typically stored in the storage device 218 and either selectively or automatically, partially or totally, loaded into the system memory 207 when the system is initially powered-on, or at a later time if so desired by a user. The browser is selectively operable to access and execute a site selection program, as herein described, either directly from a diskette in the diskette drive unit 219 or directly from a copy of the site selection program stored on the hard drive unit 218. As a program is running, either a portion of the program or the entire program may be loaded into the system memory 207 and/or the system cache memory 205.

Depending on specific program design, the system may store any information accessed from a database in the storage unit 218, the cache memory 205, the system memory 207 or directly from a diskette loaded into the diskette drive 219. Assuming a user has started-up the system, and is actively running a browser program for example, from memory, a series of screens will be displayed to the user on the display device 221. Each screen typically has one or more selections for the user to make in navigating through the program. In general, a user will make selections from a home page display screen using the keyboard 213 or the mouse or pointer device 215. In an Internet operating program, the selections made by the user will determine "where" the user "goes", i.e. to what "site" or "webpage", and also, in some cases, the communications link or the path taken to get to the site selected.

Figure 3:
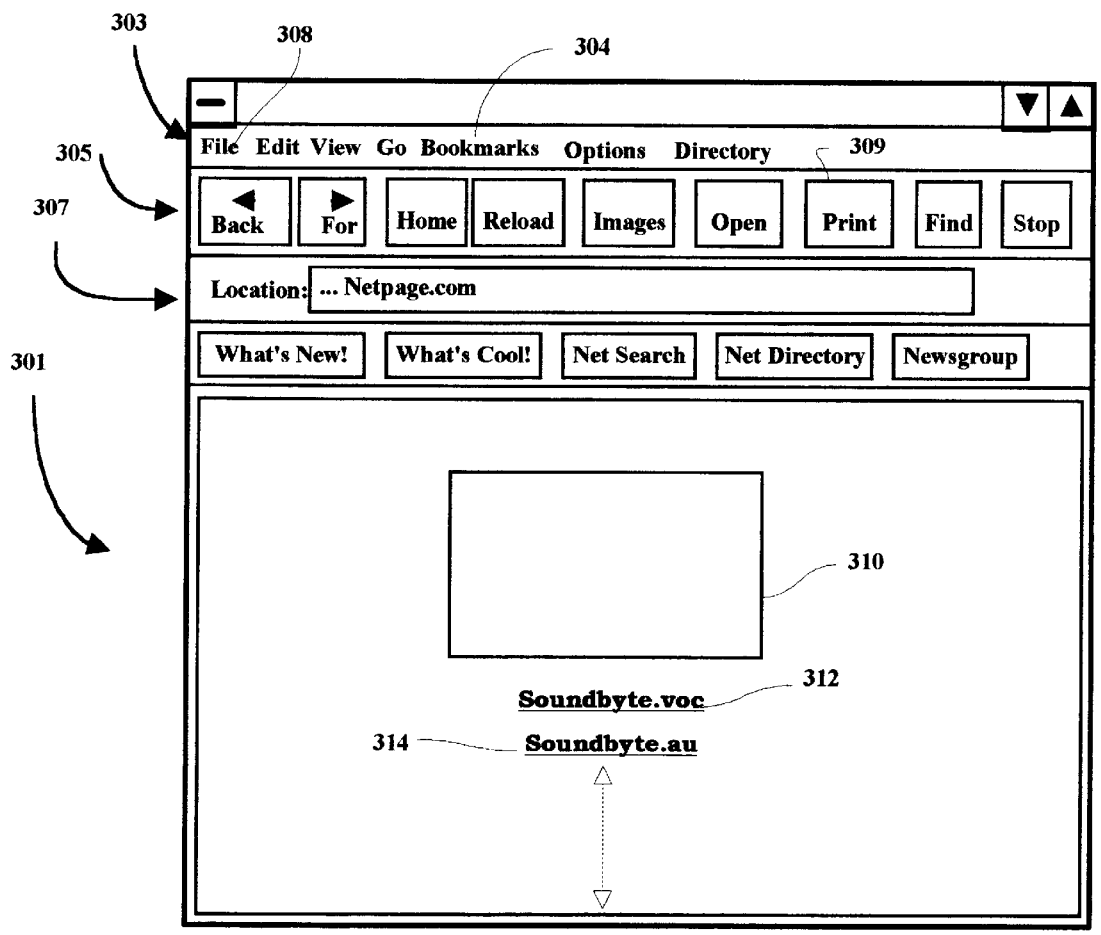
FIG. 3 is exemplary illustration of a webpage from which an audio or video file may be selected for presentation on a user terminal.

FIG. 3 illustrates a typical program screen display 301 in an Internet operating session. The browser screen generally includes a mode row 303 which displays several different modes which the user may select such as the "File" selection 308 and a "Bookmarks" selection 304. Another row 305 may be displayed to help a user quickly move through documents, sites, or pages in a network application. An address or "location" section 307 enables a user to key-in, and also displays the name of, an internet address of a site to be, or being, visited. In general, any of the illustrated items may be selected through a "point and click" methodology associated with the mouse device 215, and a cursor or pointer 320 visible on the display screen. For example, a download of data from a remote site may be immediately terminated during the transmission by pointing to the "Stop" button and clicking on a designated mouse button. Similarly, the "Back" and "Forward" buttons may be used to return to the last screen display or go forward to the next screen display, respectively.

In the FIG. 3 example, the "location" or Uniform Resource Locator (URL) designation is illustrated as "Netpage.com". Although the present invention will have application to many kinds of files having a plurality of formats in which the file may be presented, such as video and audio files, and will also have application to many kinds of networks, the present example will be discussed with respect to audio files as such files are currently available on the Internet or world wide web, it being understood that the methodology disclosed may be applied to various other networks and file systems as well. The FIG. 3 example shows a typical homepage on the "web" which includes areas of text, and several hyperlink areas which may be "selected" by pointing to the hyperlink and "clicking" on a mouse device button for example. That action will send a message from the user terminal to the server that the user wishes to hear the sound file chosen. The server, in turn, will download the selected file, and a "player" program typically located at the user terminal, will play the sound file. Generally the user knows which files can be played by the player program which the user has installed on the user terminal and will select a sound file with an appropriate file extension designation. The server, in order to accommodate all of the player programs that may be installed at all of the user terminals in the network, heretofore will have an extensive inventory of files containing the same sound content in a plurality of differing formats. However, utilizing the disclosed methodology, synthetic or virtual files may be created on the fly, on an "as needed" basis, thereby substantially reducing the number of files which would otherwise be needed to be stored by the server.

For example, a file system could contain a single audio file called "Soundbyte.wav". Upon doing a "directory" through the operating system, it would appear that there existed four sound files i.e. "Soundbyte.wav", "Soundbyte.au", "Soundbyte.voc" and "Soundbyte.raw", for example. If an application such as a web server opened "Soundbyte.voc", the server would receive a synthetic "voc" file created using the audio data content, i.e. a string of digital audio samples, contained within the "Soundbyte.wav" file, but in the "voc" format for downloading to a user terminal or for other designated purposes, to be played by a "voc" compatible audio file player. As shown in FIG. 3, one area 310 of a display screen may include a graphics illustration (not shown) and a plurality of hyperlinks, such as "Soundbyte.voc" 312 and "Soundbyte.au" 314 and others, may be presented in close proximity to the graphics display 310. When selected, for example by pointing a clicking on one of the hyperlinks 312 or 314, a sound file which may be related in some way to the graphics display 310 will be played. The listing of sound files indicates the formats in which the selected sound file can be delivered from the server.

In accordance with the present invention, all of the listed files in the various formats do not actually exist. An audio base file for the sound byte would be present on the server base file system. If the particular file that actually existed on the base file system were selected, that file would be returned to the user as a "play" file to be played on the user's audio play program. In order to save storage space on the server, instead of storing all of the bulky sound files in all of the various formats that may be requested, a conversion program is operable to convert the existing real audio file on the server to a "play" file in another selected format, and deliver the created file to a user terminal, for example, in response to a user's selection of the sound file in the selected format. The particular sound file format may also be done automatically and the user would only have to select which file was to be played without specific selection of the format. The server would be able to determine which formats the user would be capable of playing and download the selected file in an appropriate file format automatically.

Figure 4:
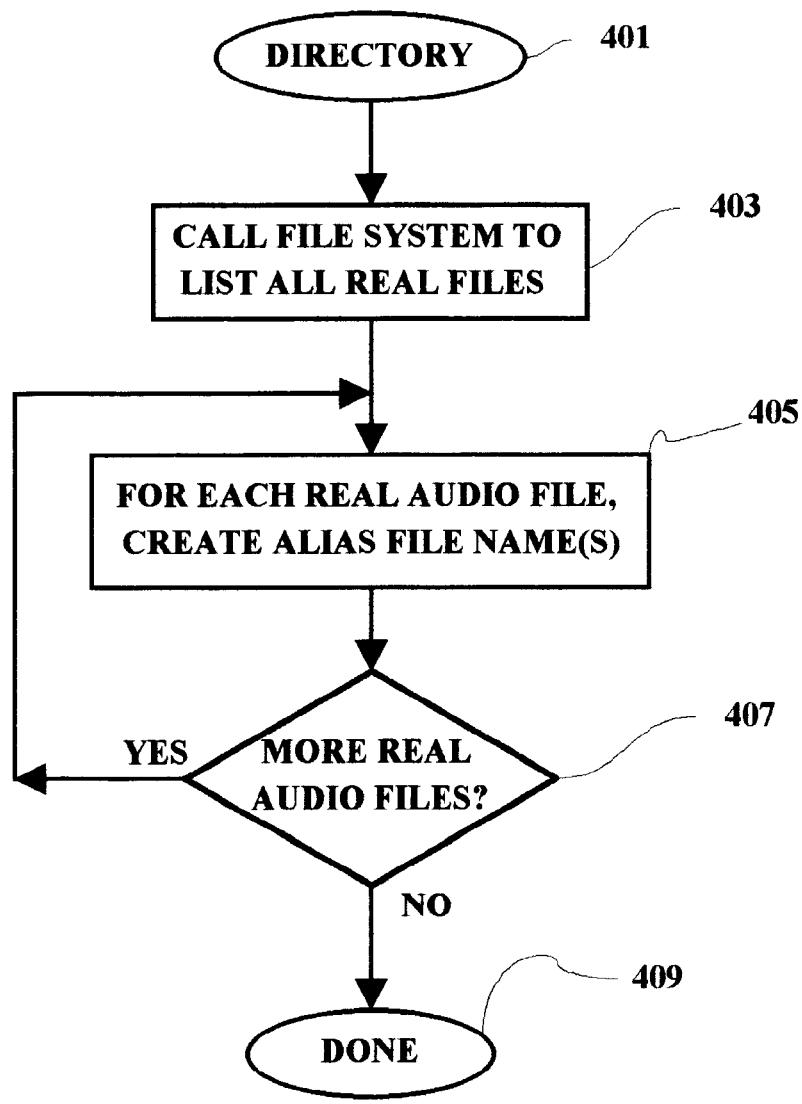
FIG. 4 is a flow chart illustrating an operational sequence in one exemplary embodiment of the methodology disclosed herein.

FIG. 4 is a flow chart illustrating an exemplary operational sequence for a "Directory" function in one implementation of the virtual file processing methodology disclosed herein. In FIG. 4, a "Directory" function 401 which may be invoked by a user or by a program, calls 403 the file system to list all of the real files in the directory. For each real file, an "alias" file name is created 405 in each of a predetermined number of selected formats. When all of the real files have had "alias" files created and there are no more real audio files 407, the method completes 409.

Figure 5:
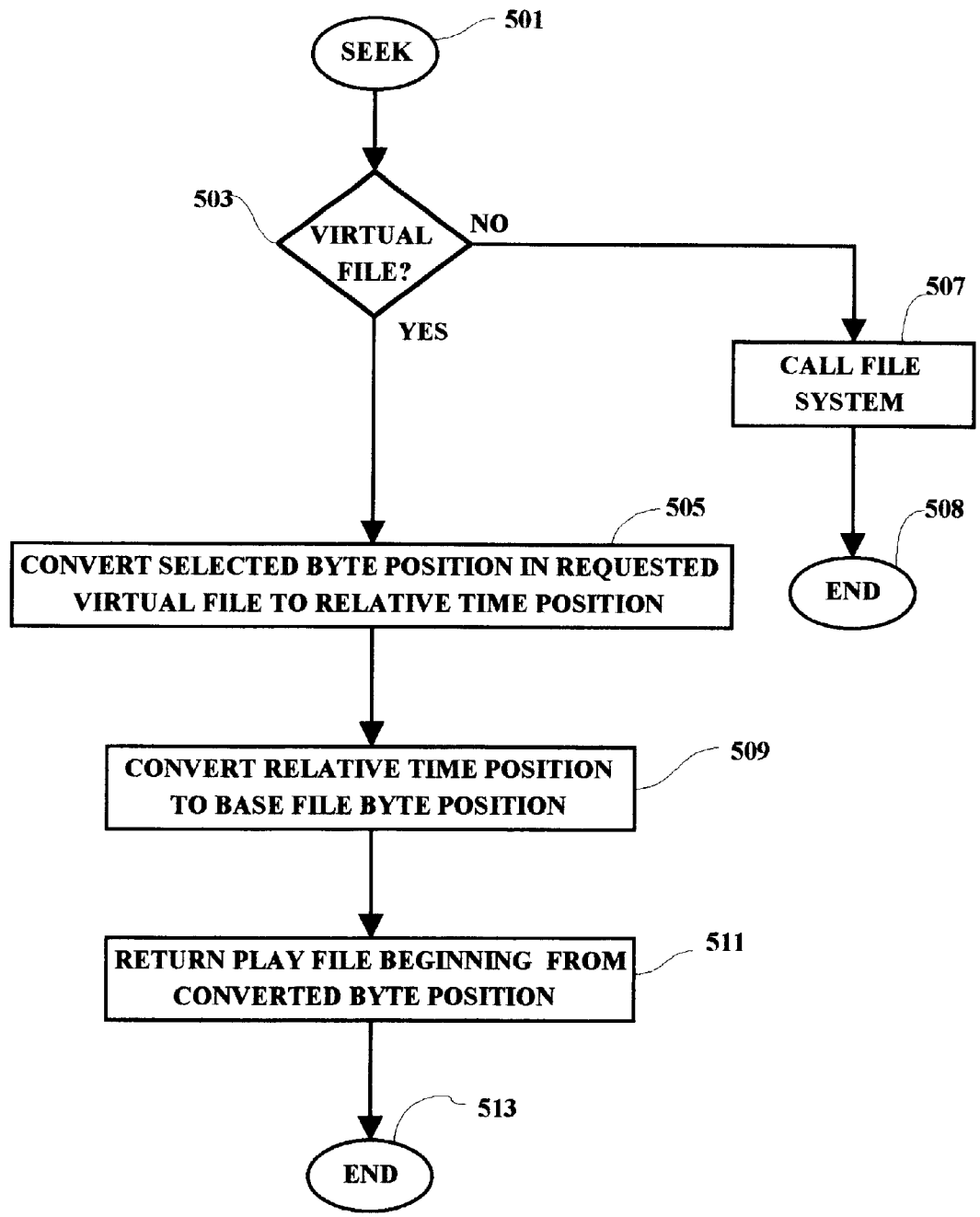
FIG. 5 is a flow chart illustrating an exemplary "seek" function operational sequence.

FIG. 5 is a flow chart illustrating the "Seek" function of the disclosed methodology. When the "Seek" function is invoked 501, if the selected file is not a "virtual" file 503, the file system is called 507 to execute the "seek" operation and the process ends 508. Otherwise, if the selected file is recognized as a "virtual" file 503, the requested byte offset associated with the seek request is converted into a relative time position 505 in the virtual file format. The calculated time position is then converted into a byte offset 509 in the base file format. Next, the base file data stream is returned or read 511 beginning from the converted byte position in the base file format, and the process ends 513. The conversion process between relative time positions and relative byte positions may be based on a linear translation, or, where data compression is implemented, the translation may be based on a non-linear relationship between corresponding positions.

Figures 6, 7:
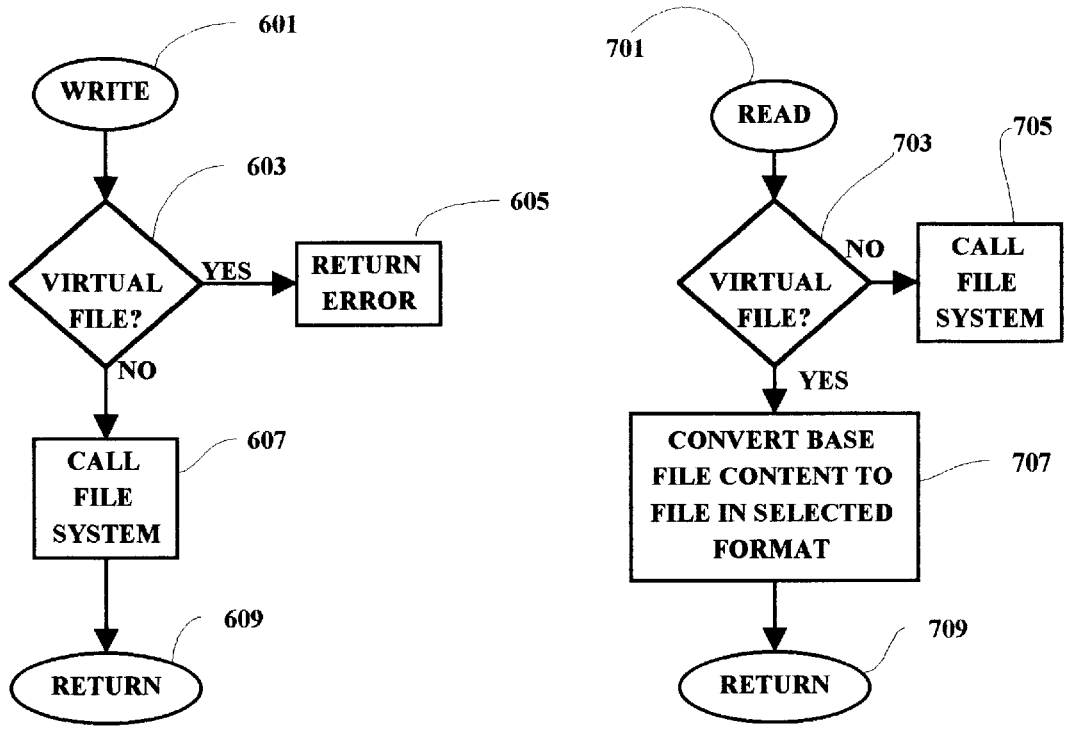
FIG. 6 is a flow chart illustrating an exemplary "write" function operational sequence.
FIG. 7 is a flow chart illustrating an exemplary "read" function operational sequence.

FIG. 6 is a flow chart illustrating an exemplary "write" function operational sequence. When a "Write" function 601 is called for by the user or a program, a check is made to determine 603 whether the file to be written to is a "virtual" file. If the designated file is only a "virtual" file, then an "Error" message is returned since virtual files as herein disclosed are created on the fly and cannot be written to as such. If, however, the subject file is not a "virtual" file 603, the file system is called 607 to continue with the "write" function of the file system and the program returns 609 to its next position.

In FIG. 7, there is shown a flow chart illustrating an exemplary "read" function operational sequence. When the "read" function is invoked 701, a determination is made 703 as to whether or not the file to be read from is a "virtual" file, i.e. a file containing the sound (for example) content of a designated audio file, but placed in a synthesized file format for a different player program. If the designated file is not a "virtual" file 703, the file system is called 705 to continue with the read operation. If, however, the designated file is a "virtual" file 703, then the base file content is converted into a file in the selected player format 707 and the program is "returned" 709 to a designated line.

The method and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely in program code stored on a disk or diskette (portable or fixed), or other memory device, from which it may be executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for enabling a distribution from a first device of a base file in a base format to a requesting device in either said base format or at least one alternate format, said first device containing said base file in only said base format, said method comprising:

effecting a display of a listing of names corresponding to files in said base format and said alternate format;

enabling a user selection of at least one of said names displayed on said listing;

receiving a request to distribute said base file in either said base file format or said alternate format to said requesting device;

distributing said base file in said base format in response to a request to distribute said base file in said base format; and in response to a request to distribute said base file in said alternate format, said method further including creating a new file in said alternate format from said base file in said base format, and distributing said new file to said requesting device.

2. The method as set forth in claim 1 wherein said listing includes a plurality of names associated with a corresponding plurality of file formats, said creating further including creating a plurality of new files from said base file in accordance with said user selections.

3. The method as set forth in claim 1 wherein said base file is a multimedia file.

4. The method as set forth in claim 3 wherein said multimedia file is an audio file.

5. An information processing system including a system bus coupling together a processing means, a display device, a user input means and a receiving device, said information processing system further including a storage means coupled to said receiving device, said information processing system being selectively operable for enabling a distribution of a base file in a base format from said storage means to said requesting device in either said base format or at least one alternate format, said storage means containing said base file in only said base format, said information processing system being selectively operable to implement a method comprising:

effecting a display of a listing of names corresponding to files in said base format and said alternate format, said display being presented on said display device;

enabling a user selection from said user input means of at least one of said names displayed on said listing;

receiving a request by said storage means from said requesting device to distribute said base file in either said base file format or said alternate format to said requesting device;

distributing said base file from said storage means in said base format in response to a request to distribute said base file in said base format; and in response to a request to distribute said base file from said storage means in said alternate format, said method further including creating a new file in said storage means in said alternate format from said base file in said base format, and distributing said new file from said storage means to said requesting device.

6. The method as set forth in claim 1 and further including:

recognizing said request as a designated file read request, said designated file read request being generated by a selection of one of said names from said listing;

determining a format associated with said designated file; and calling a file system to execute said designated file read request when said designated file is in said base format.

7. The method as set forth in claim 6 and further including:

converting content of the base file to said new file in said alternate format when said designated file read request designates said alternate format.

8. The method as set forth in claim 1 and further including:

recognizing a designated file write request, said file write request being generated in connection with a selection of one of said names from said listing;

determining a format associated with said designated file; and calling a file system to execute said designated file write request when said designated file is in said base format.

9. The method as set forth in claim 8 and further including:

returning an error message when said designated file is in an alternate format.

10. The method as set forth in claim 1 and further including:

recognizing a designated file seek request;

determining a file format associated with said designated file;

converting a byte position associated with said designated file seek request in said alternate file format to a corresponding play time position relative to the designated file play time; and converting the corresponding play time position of the designated file to a corresponding byte position.

11. The method as set forth in claim 10 and further including:

returning play file data stream to said requesting device beginning from said corresponding byte position.

12. The method as set forth in claim 10 wherein said converting uses a linear relationship between corresponding play time positions and byte positions for corresponding base format and alternate format files.

13. The method as set forth in claim 10 wherein said converting uses a non-linear relationship between corresponding play time positions and byte positions for corresponding base format and alternate format files.

14. A storage medium including machine readable coded indicia, said storage medium being selectively coupled to a reading device, said reading device being selectively coupled to processing circuitry within an information processing system, said reading device being selectively operable to read said machine readable coded indicia and provide program signals representative thereof, said program signals being effective for enabling a distribution of a base file in a base format from a storage device to a requesting device in either said base format or at least one alternate format, said storage device containing said base file in only said base format, said program signals being selectively operable to implement a method comprising:

effecting a display of a listing of names corresponding to files in said base format and said alternate format;

enabling a user selection of at least one of said names displayed on said listing;

receiving a request to distribute said base file in either said base file format or said alternate format to said requesting device;

distributing said base file in said base format in response to a request to distribute said base file in said base format; and in response to a request to distribute said base file in said alternate format, said method further including creating a new file in said alternate format from said base file in said base format, and distributing said new file to said requesting device.

15. An information processing system including a system bus coupling together a processing means, a display device, a user input means and a receiving device, said information processing system further including a storage means coupled to said receiving device, said information processing system being selectively operable for enabling a distribution of a base file in a base format from said base format or at least one alternate format, said storage means containing said base file in only said base format, said information processing system being selectively operable to implement a method comprising:

effecting a display of a listing of names corresponding to files in said base format and said alternate format, said display being presented on said display device;

enabling a user selection from said user input means of at least one of said names displayed on said listing;

receiving a request by said storage means from said requesting device to distribute said base file in either said base file format or said alternate format to said requesting device;

distributing said base file from said storage means in said base format in response to a request to distribute said base file in said base format; and in response to a request to distribute said base file from said storage means in said alternate format, said method further including creating a new file in said storage means in said alternate format from said base file in said base format, and distributing said new file from said storage means to said requesting device.

* * * * *